United States Patent [19]

Furukawa et al.

[11] Patent Number: 4,931,208

[45] Date of Patent: Jun. 5, 1990

[54] FERROELECTRIC CHIRAL SMECTIC LIQUID CRYSTAL COMPOSITION

[75] Inventors: Kenji Furukawa, Yokosukashi; Kanetsugu Terashima, Yokohamashi, both of Japan

[73] Assignees: Chisso Corporation, Osaka; Hitachi, Ltd., Tokyo, both of Japan

[21] Appl. No.: 227,912

[22] Filed: Aug. 3, 1988

Related U.S. Application Data

[60] Division of Ser. No. 124,588, Nov. 24, 1987, Pat. No. 4,780,241, which is a continuation of Ser. No. 786,697, Oct. 11, 1985, abandoned.

[30] Foreign Application Priority Data

Oct. 18, 1984 [JP] Japan ................................ 59-219152
Feb. 25, 1985 [JP] Japan ................................ 60-36003

[51] Int. Cl.$^5$ ....................... C09K 19/34; C09K 19/12; C09K 19/20; G02F 1/13
[52] U.S. Cl. ........................ 252/299.61; 252/299.01; 252/299.67; 252/299.65; 252/299.66; 350/350 S
[58] Field of Search ........... 252/299.01, 299.6, 299.61, 252/299.63, 299.65, 299.66, 299.67, 299.68; 350/350 S

[56] References Cited

U.S. PATENT DOCUMENTS

| | | | |
|---|---|---|---|
| 4,533,488 | 8/1985 | Fukui et al. | 252/299.61 |
| 4,576,732 | 3/1986 | Isogai et al. | 252/299.65 |
| 4,596,667 | 6/1986 | Inukai et al. | 252/299.65 |
| 4,622,165 | 11/1986 | Kano et al. | 252/299.65 |
| 4,657,695 | 4/1987 | Saito et al. | 252/299.61 |
| 4,714,323 | 12/1987 | Katagiri et al. | 350/350 S |
| 4,741,859 | 5/1988 | McDonnell et al. | 252/299.63 |
| 4,753,752 | 6/1988 | Raynes et al. | 252/299.65 |
| 4,769,176 | 9/1988 | Bradshaw et al. | 252/299.65 |
| 4,820,839 | 4/1989 | Krause et al. | 252/299.61 |
| 4,834,904 | 5/1989 | Krause et al. | 252/299.61 |

FOREIGN PATENT DOCUMENTS

| | | | |
|---|---|---|---|
| 156726 | 10/1985 | European Pat. Off. | 252/299.64 |
| 178647 | 4/1986 | European Pat. Off. | 252/299.65 |
| 3525015 | 1/1986 | Fed. Rep. of Germany | 252/299.65 |
| 3515373 | 11/1986 | Fed. Rep. of Germany | . |
| 3515374 | 11/1986 | Fed. Rep. of Germany | . |
| 60-235885 | 10/1985 | Japan | 252/299.65 |
| 86/02937 | 5/1986 | World Int. Prop. O. | 252/299.66 |

OTHER PUBLICATIONS

Demus, Flussige Kristalle in Tabellen, pp. 260–261 (1976).

Demus, Flussige Kristalle in Tabellen II, pp. 372–377 (1984).

Goodby et al., Journal de Physique, vol. 40, pp. C3–C27 (1979).

Goodby et al., Liquid Crystals and Ordered Fluids, vol. 4, pp. 1–32 (1984).

*Primary Examiner*—John F. Terapane
*Assistant Examiner*—J. E. Thomas
*Attorney, Agent, or Firm*—Fred Philpitt

[57] ABSTRACT

A ferroelectric liquid crystal composition having a long helical pitch and a light switching element having a quick response property are provided. This composition comprises (1) at least one member selected from the group consisting of liquid crystal compounds having a smectic C phase and no helical structure and liquid crystal compounds having only a nematic phase as a liquid crystal phase and no helical structure and (2) at least one chiral smectic liquid crystal compound.

2 Claims, 2 Drawing Sheets

FERROELECTRIC CHIRAL SMECTIC LIQUID CRYSTAL COMPOSITION

RELATED APPLICATIONS

This application is a division of application Ser. No. 124,588 filed on Nov. 24, 1987, now U.S. Pat. No. 4,780,241, which in turn is a continuation of Ser. No. 786,697 filed on Oct. 11, 1985, now abandoned, and the benefits of 35 USC 120 are claimed relative to these applications.

BACKGROUND OF THE INVENTION

1. Field of the Invention

The present invention relates to a ferroelectric liquid crystal composition and a light switching element making use of the ferroelectric liquid crystal composition. More specifically, this invention relates to a ferroelectric chiral smectic liquid crystal composition having a long helical pitch and a light switching element having a quick response property.

2. Description of the Prior Art

Liquid crystal compounds are widely used as display materials but most of such liquid crystal display elements are of a TN display mode, in which a liquid crystal material belonging to a nematic phase is used. Since the TN display mode is of a non-emissive type, it has characteristic features that it does not give fatigue to eyes, and works with extremely small power consumption. On the other hand, it has such defects that the response is slow, and that display may not be seen depending upon the angle from which it is viewed. Recently, an attempt to improve the liquid crystal material has been made for obviating these defects, particularly for meeting a demand for a quick response of display device. However, the TN display mode still involves a problem of a large response time lag to be solved, as compared with other displays of an emissive type [e.g. EL (electroluminescence) display, plasma display, etc.]. For making much of the characteristic features of the liquid crystal display element such as the passive type and small power consumption and securing a response property comparable to those of the emissive display, it is indispensable to develop a new liquid crystal display mode which can be substituted for the TN type display mode. In one of attempts of such development, N. A. Clark and S. T. Lagerwall proposed a display device which utilizes the light switching phenomenon of a ferroelectric liquid crystal [see N. A. Clark, S. T. Lagerwall; Appl. Phys. Lett., 36, 899 (1980)]. The existence of a ferroelectric liquid crystal was disclosed for the first time by R. B. Meyer et al. in 1975 [see R. B. Meyer et al.; J. de Physique, 36, L-69 (1975)]. From the viewpoint of the liquid crystal structure, ferroelectric liquid crystals belong to the chiral smectic C phase, the chiral smectic I phase, the chiral smectic F phase, the chiral smectic G phase, and the chiral smectic H phase (which will be hereinafter abbreviated as the $S_c^*$ phase, the $S_I^*$ phase, the $S_F^*$ phase, the $S_G^*$ phase, and the $S_H^*$ phase, respectively).

Application of the light switching effect of the $S_c^*$ phase to display elements provides three characteristic features superior to those of the TN display mode. The first feature is a very quick response The response time is 1/100 or less than that of a common TN display mode. The second feature is that it provides a memory effect which makes multiplexing drive easy in cooperation with the above-mentioned quick response property. The third feature is an easiness in attaining the gray scale or gradation of brightness. In the case of the TN display mode, since the gray scale is attained by controlling the applied voltage, difficult problems involving the dependence of threshold voltage on temperature and the dependence of response time on voltage are encountered. By contrast, in the case of application of the light switching effect of the $S_c^*$ phase, the gray scale can be attained easily by controlling the polarity-inversion time. Thus the latter is very suitable for graphic display or the like.

As display methods, two methods can be considered. One of them is a birefringence type which uses two polarizer plates, and the other is a guest-host type which uses dichroic dyes. Since the $S_c^*$ phase has spontaneous electric polarization, molecules turn over by a $\pi$ rotation around helical axes thereof as the axes of rotation by inverting the polarity of applied voltage. By filling a liquid crystal composition having a $S_c^*$ phase into a liquid crystal display cell that has been subjected to a surface treatment for aligning liquid crystal molecules parallel to electrode surface, disposing the liquid crystal cell between two polarizers so arranged in advance that the polarization plane of one of the polarizers is parallel to the director of liquid crystal molecules, and inverting the polarity of applied voltage, a bright range of vision and a dark range of vision (which are determined by the angle between the polarization planes) can be interexchanged. On the other hand, when the display is operated by guest-host mode, a colored range of vision and a colorless range of vision (which are determined by the arrangement of polarization plates) can be interexchanged by inverting the polarity of applied voltage.

Ferroelectric chiral smectic liquid crystal compounds known today are exemplified in Table 1 [see J. Physique, 37, C3-129 (1976)]. As can be understood from Table 1, most of ferroelectric liquid crystal compounds have a temperature range showing ferroelectricity, namely a temperature range showing the $S_c^*$, $S_I^*$, $S_F^*$, $S_G^*$ or $S_H^*$ phase, above room temperature. Thus they cannot be employed as display element materials as they are. Besides, chiral smectic liquid crystal compounds have a possibility that there may exist the smectic $B^-$ phase or the smectic E phase (which will be hereinafter abbreviated as "$S_B$ phase" and "$S_E$ phase", respectively) showing no ferroelectricity. Therefore, a chiral smectic liquid crystal composition showing ferroelectricity in a practical temperature range cannot be easily obtained. No chiral smectic liquid crystal compositions (a) showing ferroelectricity in a practical temperature range including room temperature, (b) having a large spontaneous electric polarization, and (c) having a long helical pitch have been obtained as yet.

TABLE 1

| Compound | Phase transition temperature |
|---|---|
| $C_{10}H_{21}O-\underset{}{\bigcirc}-CH=N-\underset{}{\bigcirc}-CH=CH-\underset{\underset{O}{\parallel}}{C}-O-CH_2\overset{*}{C}H-C_2H_5$ <br> $\phantom{xxxxxxxxxxxxxxxxxxxxxxxxxxxxxxxxxxxxxxxxxx}CH_3$ | $C \xrightarrow{76° C.} S_C^* \xrightarrow{95° C.} S_A \xrightarrow{117° C.} I$ <br> $\phantom{xxxx}\searrow_{63° C.}$ <br> $\phantom{xxxxxx}S_H^*$ |
| $C_8H_{17}O-\underset{}{\bigcirc}-CH=N-\underset{}{\bigcirc}-CH=\underset{Cl}{C}-\underset{\underset{O}{\parallel}}{C}-O-CH_2\overset{*}{C}H-C_2H_5$ <br> $\phantom{xxxxxxxxxxxxxxxxxxxxxxxxxxxxxxxxxxxxxxxxxx}CH_3$ | $C \xrightarrow{41° C.} S_A \xrightarrow{66° C.} I$ <br> $\phantom{xxxx}\searrow_{38° C.}$ <br> $\phantom{xxxxxx}S_C^*$ |
| $C_{10}H_{21}O-\underset{}{\bigcirc}-CH=N-\underset{}{\bigcirc}-CH=\underset{CN}{C}-\underset{\underset{O}{\parallel}}{C}-O-CH_2\overset{*}{C}H-C_2H_5$ <br> $\phantom{xxxxxxxxxxxxxxxxxxxxxxxxxxxxxxxxxxxxxxxxxx}CH_3$ | $C \xrightarrow{92° C.} S_A \xrightarrow{104° C.} I$ <br> $\phantom{xxxx}\searrow_{75° C.}$ <br> $\phantom{xxxxxx}S_C^*$ |
| $C_6H_{13}O-\underset{}{\bigcirc}-CH=N-\underset{}{\bigcirc}-CH=CH-\underset{\underset{O}{\parallel}}{C}-O-CH_2\overset{*}{C}H-C_2H_5$ <br> $\phantom{xxxxxxxxxxxxxxxxxxxxxxxxxxxxxxxxxxxxxxxxxx}Cl$ | $C \xrightarrow{60° C.} S_G^* \xrightarrow{67° C.} S_I^* \xrightarrow{74° C.} S_C^* \xrightarrow{80° C.} S_A^* \xrightarrow{135° C.} I$ |

(Note)
In the column of "phase transition temperature", C, $S_A$ and I stand for crystal, smectic A, and isotropic liquid phases, respectively, and the others stand for the respective phases as mentioned hereinbefore.

SUMMARY OF THE INVENTION

As is apparent from the foregoing description, the first object of this invention is to provide a chiral smectic liquid crystal composition (a) showing ferroelectricity in a wide temperature range from around room temperature, (b) having a large spontaneous electric polarization, and (c) having a long helical pitch. The second object of this invention is to provide a light switching element capable of quick response.

The inventors of the present invention have made investigations on liquid compositions mainly comprising a chiral smectic liquid crystal compound, and, as a result, have unexpectedly found that addition of a liquid crystal compound having a nematic phase and/or a smectic C phase to a chiral smectic liquid crystal compound can provide a chiral smectic liquid crystal composition showing ferroelectricity in a wide temperature range from around room temperature. Based on this finding, they have completed the present invention.

More specifically, in one aspect of this invention, there is provided:

(1) a ferroelectric chiral smectic liquid crystal composition comprising at least one compound selected from the group consisting of liquid crystal compounds having a smectic C phase and no helical structure and liquid crystal compounds having only a nematic phase as liquid phase and no helical structure, and at least one chiral smectic liquid crystal compound. Embodiments thereof will be described under (2) to (9) below.

(2) A ferroelectric chiral smectic liquid crystal composition as described in (1) above, which comprises at least one compound having a twist sense of helix left-handed and at least one compound having a twist sense of helix right-handed as said chiral smectic liquid crystal compound.

(3) A ferroelectric chiral smectic liquid crystal composition as described in (1) or (2) above, which comprises 1 to 30% by weight of said liquid crystal compound having only a nematic phase as liquid crystal phase and no helical structure and 99 to 70% by weight of said chiral smectic liquid crystal compound.

(4) A ferroelectric chiral smectic liquid crystal composition as described in (3) above, in which said liquid crystal compound having only a nematic phase as a liquid crystal phase and no helical structure is a compound having a clearing point higher than 70° C. and lower than 250° C.

(5) A chiral smectic liquid crystal composition as described in (1) or (2) above, which comprises 5 to 95% by weight of said liquid crystal compound having a smectic C phase and no helical structure, and 95 to 5% by weight of said chiral smectic liquid crystal compound.

(6) A ferroelectric chiral smectic liquid crystal composition as described in any one of (1) to (5) above, wherein said chiral smectic liquid crystal compound is an optically active compound represented by a general formula (I):

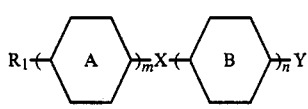

(I)

wherein

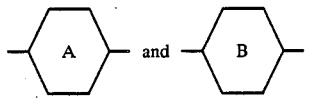

each independently are a benzene ring or a cyclohexane ring; m and n each independently are an integer of 1 or 2; X is

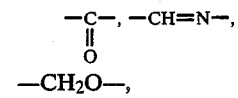

—CH$_2$O—,

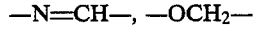

—N=CH—, —OCH$_2$— or a single bond; R$_1$ is an alkyl or alkyloxy group having 1 to 18 carbon atoms; and Y is an alkyl, alkyloxy, alkoxycarbonyl, alkanoyl or alkanoyloxy group having an asymmetric carbon atom.

(7) A ferroelectric chiral smectic liquid crystal composition as described in any one of (1) to (6) above, wherein the liquid crystal compound having no helical structure is at least one compound selected from the group consisting of compounds represented by the following general formulae (II) to (XIV):

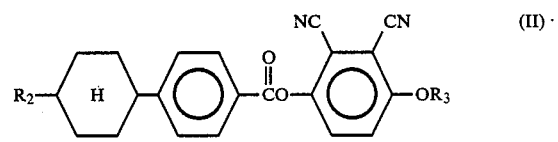

(II)

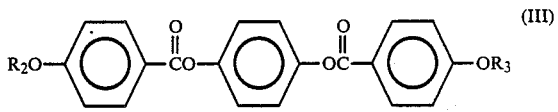

(III)

(IV)

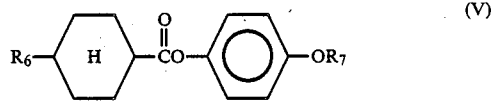

(V)

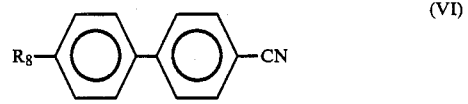

(VI)

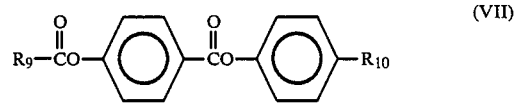

(VII)

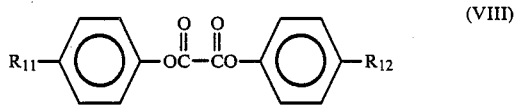

(VIII)

-continued

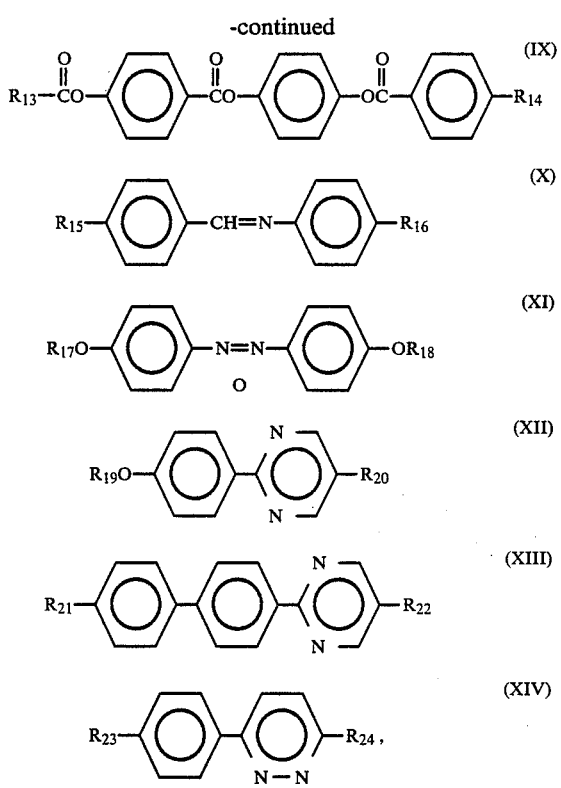

wherein $R_2$ and $R_3$ each independently are an alkyl group having 1 to 18 carbon atoms; $R_4$ and $R_5$ each independently are an alkyl or alkyloxy group having 1 to 18 carbon atoms; $R_6$ and $R_7$ each independently are alkyl group having 5 to 18 carbon atoms; $R_8$ is an alkyl or alkyloxy group having 5 to 18 carbon atoms; $R_9$ is an alkyl group having 6 to 9 carbon atoms or an alkyloxy group having 8 or 9 carbon atoms; $R_{10}$ is an alkyl or alkyloxy group having 6 to 10 carbon atoms; $R_{11}$ and $R_{12}$ each independently are an alkyloxy group having 7 to 10 carbon atoms; $R_{13}$ is an alkyl or alkyloxy group having 7 to 9 carbon atoms; $R_{14}$ is an alkyloxy group having 7 to 9 carbon atoms; $R_{15}$ is an alkyloxy group having 5 to 7 carbon atoms; $R_{16}$ is an alkyl group having 4 to 8 carbon atoms; $R_{17}$, $R_{18}$ and $R_{20}$ each independently are an alkyl group having 7 to 18 carbon atoms; $R_{19}$ and $R_{22}$ each independently are an alkyl group having 6 to 18 carbon atoms; $R_{21}$ is an alkyl or alkyloxy group having 5 to 18 carbon atoms; $R_{23}$ is an alkyl or alkyloxy group having 6 to 18 carbon atoms; and $R_{24}$ is an alkyl group having 5 to 18 carbon atoms.

(8) A ferroelectric chiral smectic liquid crystal composition as described in any one of (1) to (6) above, in which said liquid crystal compound having a smectic C phase and no helical structure is at least one racemate of a compound represented by the general formula (I) as described above.

(9) A light switching element employing a ferroelectric chiral smectic liquid crystal composition comprising at least one member selected from the group consisting of liquid crystal compounds having a smectic C phase and no helical structure and liquid crystal compounds having only a nematic phase as liquid phase and no helical structure, and at least one chiral smectic liquid crystal compound.

DETAILED DESCRIPTION OF THE INVENTION.

Figure 3:
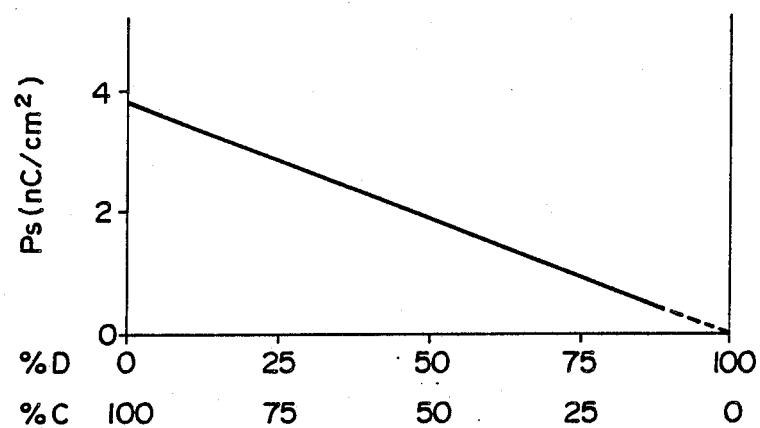
Figure 4:
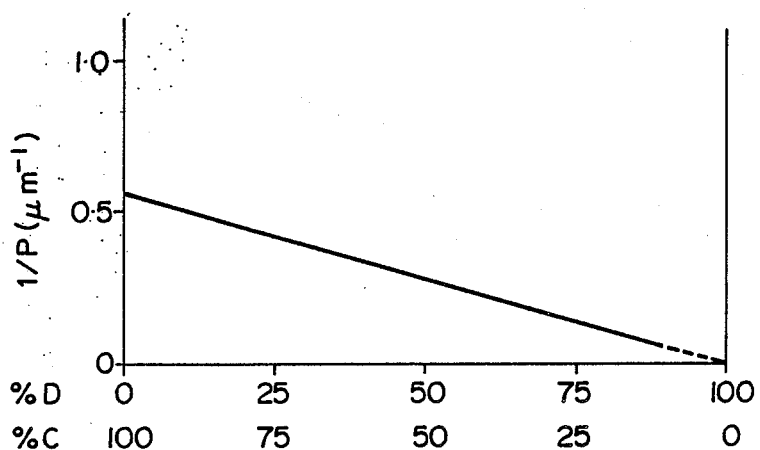

FIGS. 3 and 4 are diagrams of the same kinds as described above in a binary system of a compound C and a compound D as mentioned in the following DETAILED DESCRIPTION OF THE INVENTION.

DETAILED DESCRIPTION OF THE INVENTION

Examples of a chiral smectic liquid crystal compound to be used in the present invention, which has a helical structure and is represented by the general formula (I), include the following compounds, i.e. many compounds having a substituent derived from (S)-2-methylbutanol, (S)-1-methylheptanol or (R)-1-methylheptanol as the group having an asymmetric carbon atom and represented by Y in the formula (I). The spontaneous electric polarization is 3 to 5 nC/cm$^2$, which is not so large, as regards compounds having a substituent derived from (S)-2-methylbutanol; and 50 to 100 nC/cm$^2$, which is very large, as regards compounds having a substituent derived from (S)- or (R)-1-methylheptanol.

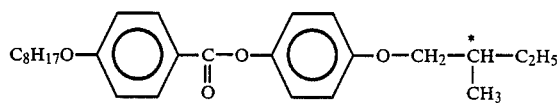

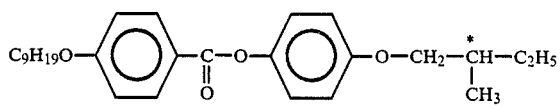

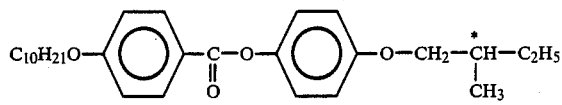
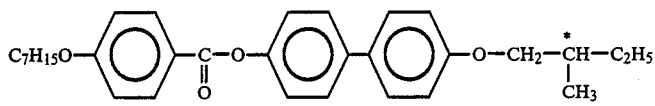
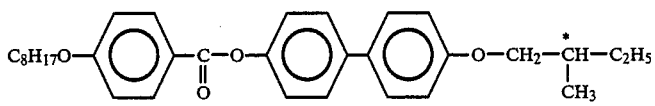
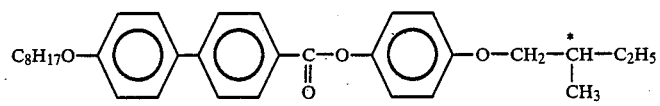
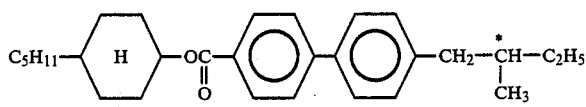
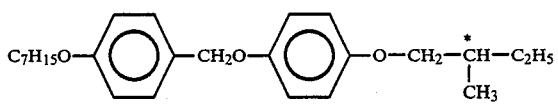
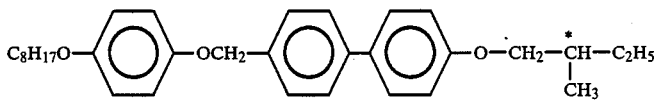
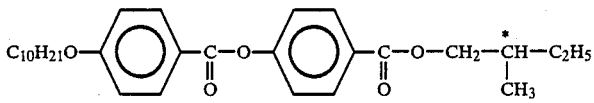
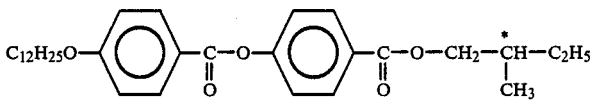
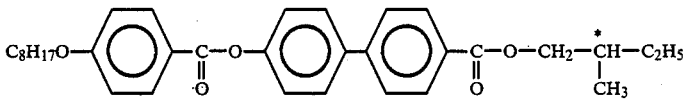
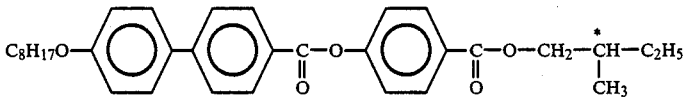
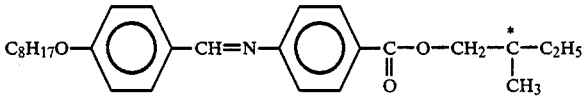
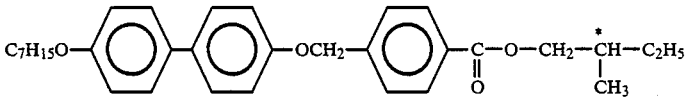

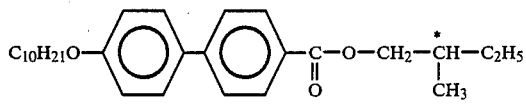

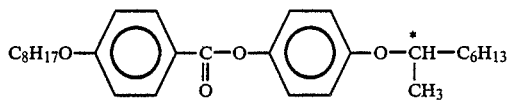

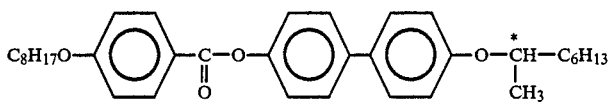

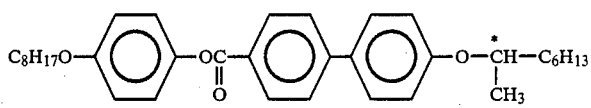

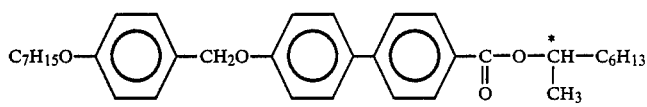

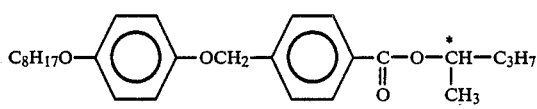

In the above-mentioned structural formulae, the asterisks are intended to mean that carbon atoms to which they are attached are asymmetric carbon atoms. Thus, the above-mentioned liquid crystal compounds having a helical structure are, of course, optically active compounds.

Examples of liquid crystal compounds having only a nematic phase as the liquid phase and no helical structure that can be used in the present invention include the following compounds.

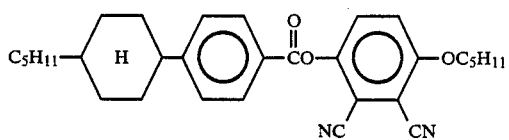

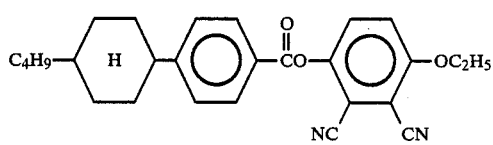

-continued

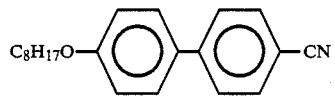

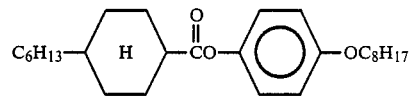

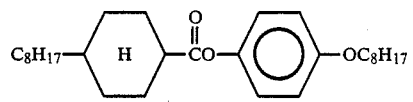

Examples of liquid crystal compounds having two phases, a nematic phase and a smectic C phase, and no helical structure that can be used in the present invention include the following compounds.

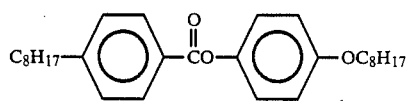

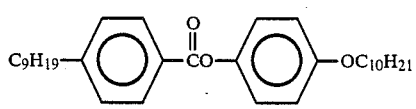

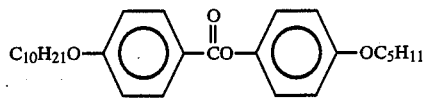

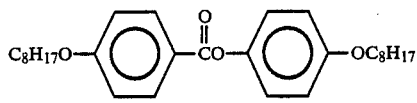

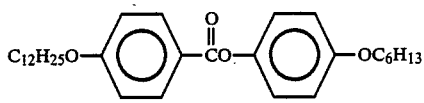

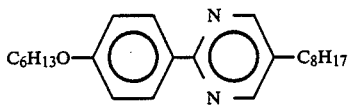

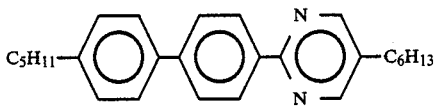

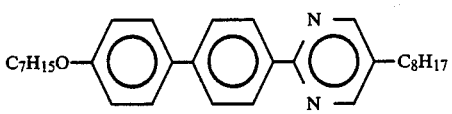

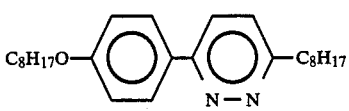

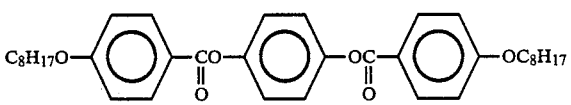

Examples of an optically inactive compound (racemate) having no helical structure that can be used in the present invention include the following compounds.

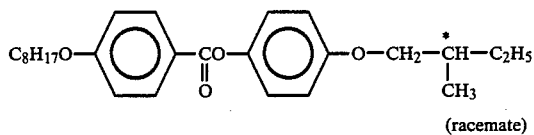
(racemate)

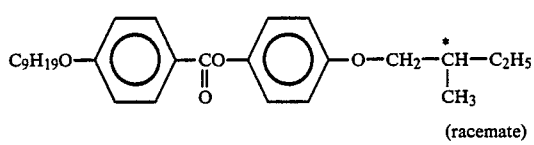
(racemate)

When a liquid crystal compound having only a nematic phase as the liquid phase is added to a chiral smectic liquid crystal compound in the present invention, the mutual compatibility of these two compounds is good, and a region where the composition obtained shows a cholesteric phase appears on the high temperature side of a region where the composition shows a smectic phase. Accordingly, the region of smectic phase is forced to move toward the low temperature side. Thus the lower limit of the $S_c^*$ phase is lowered. In this case, it is believed that, since lowering of the upper limit of the $S_c^*$ phase is moderate as compared with that of the lower limit, the temperature range of the $S_c^*$ phase spreads. For example, in Example 2 given later where 10% by weight of a liquid crystal compound having a nematic phase was added to a chiral smectic liquid crystal composition, the lower limit of the $S_c^*$ phase was lowered from 27° C. to 19° C., while, by contrast, the upper limit of the $S_c^*$ phase shifted from 59° C. to 56° C., which is no substantial change. Thus the region of $S_c^*$ phase expands. In many cases, there can be found such a content of a nematic liquid crystal compound to be added that the lower limit of the $S_c^*$ phase is greatly lowered while the upper limit is hardly lowered or is rather elevated.

A preferable content of a nematic compound is 1 to 30% by weight of a resulting chiral smectic liquid crystal composition. The lower limit temperature of the $S_c^*$ phase scarcely changes in case of an addition of less than 1% of a nematic compound. A content of a nematic compound more than 30% by weight of the composition not only provides an extreme lowering of the upper limit of the $S_c^*$ phase by width of 10° C. or more, but also decreases a spontaneous electric polarization of the composition due to addition of the nematic compound showing no ferroelectricity. Accordingly, addition of more than 30% of a nematic liquid crystal compound is not preferred.

When the amount of a nematic liquid crystal compound added is 30% or less, the value of spontaneous electric polarization of the composition obtained is not substantially affected. The helical pitch is slightly elongated by addition of a nematic liquid crystal compound. The clearing point of a nematic liquid crystal compound added is desired to be 70° to 250° C. When a nematic liquid crystal compound having a low clearing point, such as

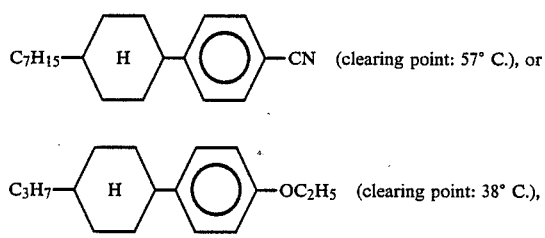

is used, the upper limit of the $S_c{}^*$ phase is lowered. This is not preferable.

Appearance of the cholesteric phase in the composition is favorable for obtaining a monodomain cell where liquid crystal molecules are uniformly oriented. Gradual cooling of the composition under an electric field applied easily provides a monodomain. A longer helical pitch in the cholesteric phase is preferred since it provides better orientation. This can be accomplished by mixing a chiral liquid crystal compound having a twist sense of helix right-handed and a chiral liquid crystal compound having a twist sense of helix left-handed.

Figure 1:
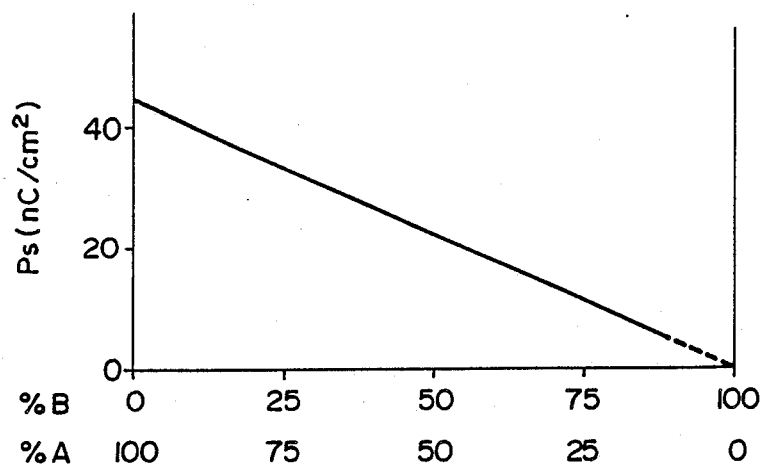
FIGS. 1 and 2 are diagrams showing the values of spontaneous electric polarization and the reciprocal of helical pitch, respectively, in a binary system of a compound A and a compound B as mentioned in the following
Figure 2:
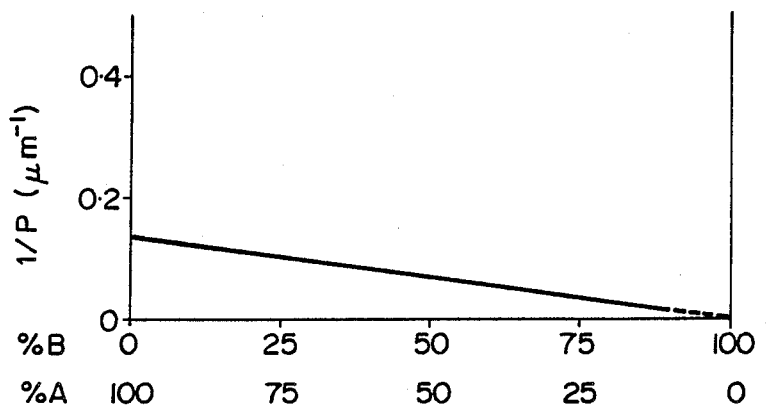

The effect of use of a liquid crystal compound having a smectic C. phase (which will be hereinafter abbreviated as an "Sc phase") and no helical structure will now be explained with reference being made to instances. FIGS. 1 and 2 shows the dependencies, on concentration, of the value of spontaneous electric polarization (Ps) and the reciprocal of helical pitch (1/P) of a binary mixture at a measurement temperature (T) lower by 15° C. than the $S_c{}^*$-$S_A$ phase transition temperature (Tc) (hereinafter abbreviated as something like T−Tc=−15° C.) in a binary system of the mixture of a compound A corresponding to the formula (I) in which

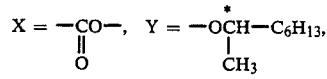

and $R_1=C_8H_{17}O-$, namely (Compound A)

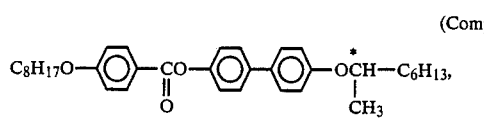

and a compound B corresponding to the formula (III) in which $R_2=C_8H_{17}O-$ and $R_3=C_8H_{17}O-$ and having no helical structure, namely (Compound B)

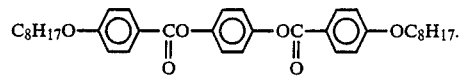

As is apparent from FIGS. 1 and 2, additivity in accordance with the composition (% of components) can be observed either in the value of spontaneous electric polarization or in the reciprocal of helical pitch. When the compound A concentration is 20% by weight, the spontaneous electric polarization is as large as 8.5 nC/cm², and the helical pitch is as very long as 33 μm. This suggests that ferroelectric chiral smectic liquid crystal composition having a long helical pitch can be easily obtained.

FIGS. 3 and 4 shows the dependencies of Ps and 1/P on concentration at T−Tc=−15° C. in a binary system of a mixture of a compound C corresponding to the formula (I) in which m=1, n=1,

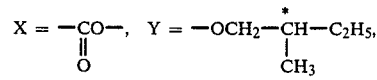

and $R_1=C_8H_{17}O-$, namely (Compound C)

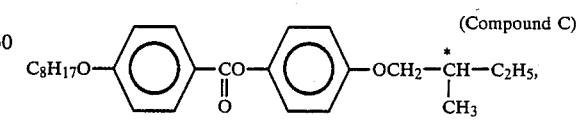

and a compound D corresponding to the formula (IV) in which $R_4=C_8H_{17}O-$ and $R_5=C_{10}H_{21}O-$ and having no helical structure, namely (Compound D)

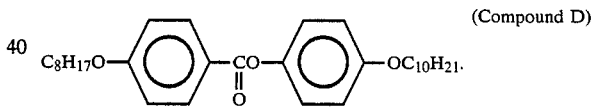

As is apparent from FIGS. 3 and 4, when the compound C concentration is 30% by weight, the value of spontaneous electric polarization is 1.2 nC/cm², and the helical pitch is as very long as 7.1 μm. In the same way as in the instance as mentioned before, this suggests that a ferroelectric chiral smectic liquid crystal composition having a long pitch can be easily obtained.

The content of a liquid crystal compound having a Sc phase and no helical structure in the liquid crystal composition of this invention is preferably 5 to 95% by weight, more preferably 10 to 90% by weight. When the content of a liquid crystal compound having a Sc phase and no helical structure exceeds 95% by weight, the spontaneous electric polarization of the composition obtained may be impractically decreased even if a chiral smectic liquid crystal compound having a very large spontaneous electric polarization is used as the other component. On the other hand, when the content of a liquid crystal compound having a Sc phase and no helical structure is less than 5% by weight, lowering of the lower limit temperature in the $S_c{}^*$ phase of the composition obtained may be impractically small.

Where a compound having not so large spontaneous electric polarization, such as a derivative of 2-methylbutanol, is used as a chiral smectic liquid crystal compound, the content of a compound having no helical structure as the other component is preferably 80% by weight or less when consideration is given to the value of spontaneous polarization of the composition.

In the present invention, by addition of a liquid crystal compound having a Sc phase and no helical structure to a chiral smectic liquid crystal compound having a very large spontaneous electric polarization, a liquid crystal composition having an elongated helical pitch and a expanded region of $S_c^*$ phase can be obtained. In general, many of liquid crystal compounds having a Sc phase and no helical structure are those having a nematic phase on the high temperature side of the Sc phase. Thus addition of a compound of the kind as mentioned above can lower the lower limit temperature of the $S_c^*$ phase of the composition obtained.

Besides the above-mentioned advantages, where a chiral smectic liquid crystal compound having a very large spontaneous electric polarization is used as a component;

(a) choice of the component compound advantageously can be made from a wide range since the chiral smectic liquid crystal compound chosen as the component is not limited in an aspect of the twist sense of helix thereof.

(b) Since the content of chiral smectic liquid crystal can be made smaller a ferroelectric liquid crystal composition, and hence, a light switching element capable of high speed response can advantageously be obtained Many compounds in which Y is

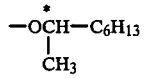

or

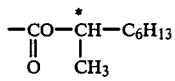

the formula (I) have a large spontaneous electric polarization, such as 80 to 100 nC/cm². Thus addition of even a small amount of a ferroelectric liquid crystal compound of the kind as mentioned above can provide a composition having a sufficiently large spontaneous electric polarization.

When a chiral smectic liquid crystal compound having not so large a spontaneous electric polarization is to be used as a component, it is necessary to increase the content thereof to some extent. In this case, it is effective for elongating helical pitch of the composition to mix a compound having a twist sense of helix righthanded and a compound having a twist sense of helix lefthanded. In this type of compositions, minute adjustment of the helical pitch can be relatively easily made.

As described above, according to the present invention, there can be obtained a chiral smectic liquid crystal composition having a region of $S_c^*$ phase spreading in a wide temperature range from around room temperature, a large spontaneous electric polarization, and a long helical pitch.

A liquid crystal display element capable of a very quick response can be obtained using the liquid crystal composition of this invention as a liquid crystal material.

The present invention will be described further by way of examples but it is not offered by way of limitation. In addition values of spontaneous electric polarizations were measured by Sawyer-Tower method and helical pitches were obtained by directly measuring with a polarizing microscope, the distance of stripped patterns corresponding to full pitch by using a homogeneously aligned cell.

EXAMPLE 1

A liquid crystal composition consisting, as compounds represented by the general formula (I), of the following three kinds of compounds i.e. 40 parts by weight of

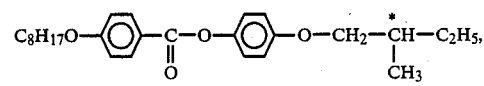

30 parts by weight of

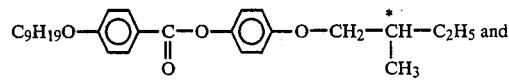

20 parts by weight of

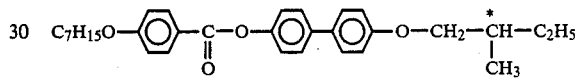

(which will be abbreviated hereinafter as composition A) showed ($S_B$-$S_c^*$) phase transition temperature and ($S_c^*$-$S_A$) phase transition temperature of 27° C. and 59° C., respectively and turned into isotropic liquid (which will be abbreviated hereinafter as I phase). Namely, the $S_c^*$ phase temperature range in which the composition A showed ferroelectric property, was from 27° C. to 59° C.

When 10 parts by weight of a liquid crystal compound having a nematic phase and a formula of

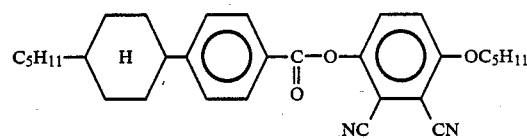

i.e. compound of the formula (II) in which both $R_2$ and $R_3$ are pentyl group, was added to 90 parts by weight of the composition A, the temperature range of $S_c^*$ phase turned to 0° ~ 65° C. and the value of spontaneous electric polarization was 3.8 nC/cm2 at 30° C. and the length of helical pitch was 25 μm. Namely, a ferroelectric chiral smectic liquid crystal composition in which the temperature range of $S_c^*$ phase was expanded from 32° C. to 65° C. and the lower limit temperature of $S_c^*$ phase was extremely lowered, was obtained by the addition of a compound having a nematic phase.

EXAMPLE 2

When 10 parts by weight of a liquid crystal compound having a nematic phase and a formula (III) in which both $R_2$ and $R_3$ are octyl group i.e.

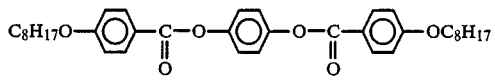

were added to 90 parts by weight of the composition A indicated in Example 1, a ferroelectric chiral smectic liquid crystal composition was obtained, in which composition, the temperature range of $S_c^*$ phase was expanded to 19° C.~56° C. (i.e. expansion of temperature of 37° C. in width), the lower limit temperature of $S_c^*$ was lowered and a value of spontaneous electric polarization was 3.5 nC/cm² at 25° C.

EXAMPLE 3

The chiral smectic liquid composition consisting of 45 parts by weight of

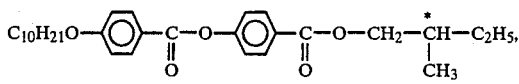

25 parts by weight of

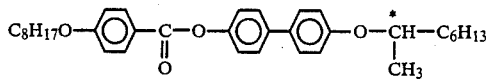

30 parts by weight of

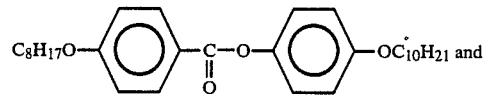

(which will be hereinafter abbreviated as composition B) had a melting point of 32° C., showed $S_c^*$ phase in the range of 32° C.~46° C., turned to $S_A$ phase at a temperature over 46° C. and to I-phase at 89° C. Namely, the temperature range of $S_c^*$ phase had a width of 14° C. When one kind of a liquid crystal compound having a nematic phase was added to the composition B to give a component ratio of 20 parts by weight of

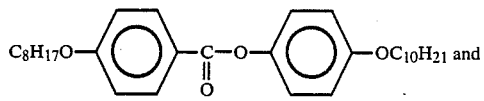

80 parts by weight of the composition B, the melting point (C-$S_c^*$ phase transition temperature) became 23° C. and $S_c^*$-$S_A$ phase transition temperature became 57° C. A spontaneous electric polarization showed an extremely large value such as 20.0 nC/cm² at 25° C. Namely, a ferroelectric chiral smectic liquid crystal composition was obtained, in which a temperature range of $S_c^*$ phase was expanded to 23°~57° C. i.e. a width of 34° C. and the lower limit temperature of $S_c^*$ phase was lowered.

EXAMPLE 4

A chiral smectic liquid crystal composition having a component ratio of 40 parts by weight of

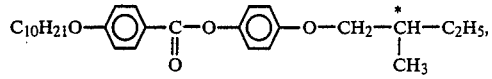

20 parts by weight of

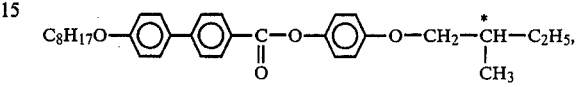

20 parts by weight of

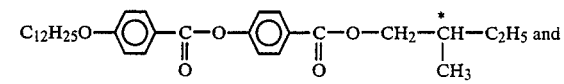

20 parts by weight of

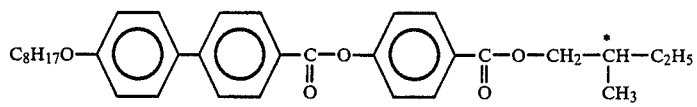

(which will be hereinafter abbreviated as composition C) had a $S_B$-$S_c^*$ phase transition temperature of 30° C., $S_c^*$-$S_A$ phase transition temperature of 62° C. and a transition temperature to I phase of 110° C. Namely, $S_c^*$ phase range was 30°~62° C. i.e. temperature range of 32° C. in width.

By adding a liquid crystal compound having a nematic phase, which was used in Examples 2 and 3, to this composition C, to give a component ratio of 20 parts by weight of

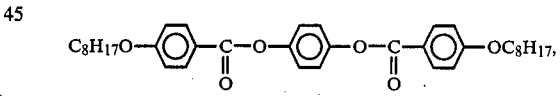

10 parts by weight of

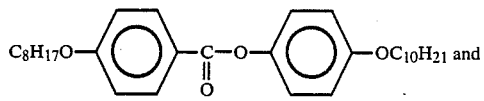

70 parts by weight of composition C., a ferroelectric chiral smectic liquid crystal composition was obtained, in which composition, the lower limit temperature of $S_c^*$ phase was greatly lowered such as 15° C., the upper limit temperature was turned to 58° C., the range of $S_c^*$ phase was expanded to 43° C. in width. The value of spontaneous electric polarization of this composition was 3.0 nC/cm² at 20° C.

EXAMPLE 5

A chiral smectic liquid crystal composition prepared by selecting three kinds of compounds belonging to the general formula (I), and having a component ratio of 45 parts by weight of

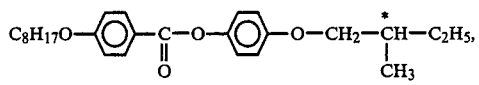

35 parts by weight of

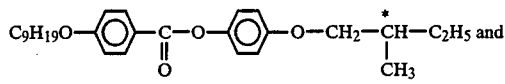

20 parts by weight of

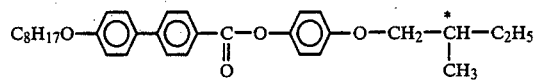

(which will be hereinafter abbreviated as composition D) showed SB phase till 30° C., $S_c^*$ phase at a temperature higher than this temperature, turned to $S_A$ phase at 50° C. and to I phase at 90° C. Namely, the temperature range of $S_c^*$ phase which showed ferroelectric property was 30°—50° C., i.e. 20° C. in width. When a liquid crystal compound having a nematic phase was added to this composition D to give a component ratio of 10 parts by weight of

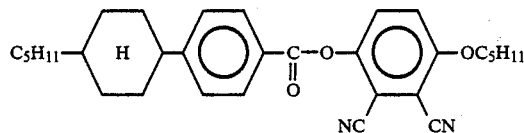

and 90 parts by weight of the composition D, a ferroelectric chiral smectic liquid crystal composition was obtained in which composition, the lower limit temperature of $S_c^*$ phase was lowered, showing $S_c^*$ phase in the temperature range of 23°~55° C. (32° C. in width). The value of spontaneous electric polarization of the resulting composition was 4.0 nC/cm² at 25° C.

EXAMPLE 6

A chiral smectic liquid crystal composition consisting of 40 parts by weight of

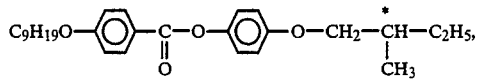

40 parts by weight of

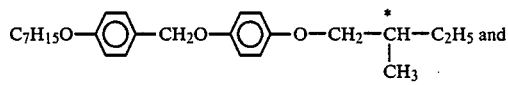

20 parts by weight of

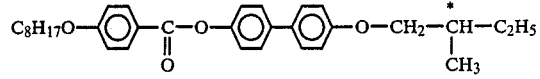

(which will be hereinafter abbreviated as composition E) had a melting point (a C-$S_c^*$ phase transition temperature) of 32° C. and a $S_c^*$-$S_A$ phase transition temperature of 55° C. and a clearing point of 87° C. Namely, a $S_c^*$ phase temperature range had a range of 32°~55° C. i.e. a width of 23° C.

When one kind of a compound having a nematic phase was added to this composition E to give a component ratio of 5 parts by weight of

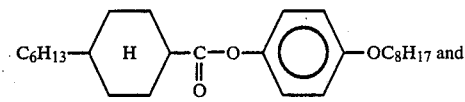

95 parts by weight of the composition E, C-$S_c^*$ phase transition temperature was lowered to 25° C. and $S_c^*$-$S_A$ phase transition temperature was turned to 53° C. Namely, a ferroelectric chiral smectic liquid crystal composition in which the temperature range of $S_c^*$ phase was expanded to 25°~53° C., i.e. a width of 28° C. and the lower limit temperature of $S_c^*$ phase was lowered. The value of spontaneous electric polarization of resulting composition was 2.0 nC/cm² at 35° C.

EXAMPLE 7

A chiral smectic liquid crystal composition consisting of 2 kinds of compound represented by the formula (I), having a component ratio of 85 parts by weight of

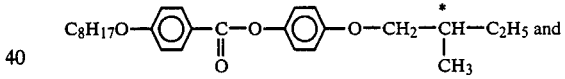

15 parts by weight of

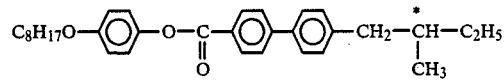

(which will be hereinafter abbreviated to composition F) melted at 38° C. indicating $S_c^*$ phase, turned to $S_A$ phase at 50° C., to cholesteric phase at 62° C. and to isotropic liquid at 70° C. Namely, the temperature range of $S_c^*$ phase which showed ferroelectric property was 38° C.~50° C. i.e. a width of 12° C.

When 10 parts by weight of a liquid crystal compound having the same nematic phase as in Example 2, i.e. a formula of

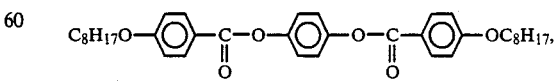

were added to 90 parts by weight of this composition F, a melting point of a resulting composition was lowered to 28° C., $S_c^*$ phase was in the temperature of 28° C.~51° C. and $S_A$ phase was in the range of temperature over 51° C. Further a value of spontaneous electric polarization measured at 31° C. was 2.5 nC/cm². Namely, a ferroelectric chiral smectic liquid crystal composition in which a temperature range of $S_c^*$ phase was expanded to a width of 23° C. and the lower limit temperature of $S_c^*$ phase was lowered, was obtained.

EXAMPLE 8

By using a chiral smectic liquid crystal compound having a helical structure and represented by a general formula of (I) and liquid crystal compounds represented by general formulae of (IV) and (XII) and having Sc phase which do not have helical structure, chiral smectic liquid crystal compositions having a following component ratio were prepared. 20 part by weight of

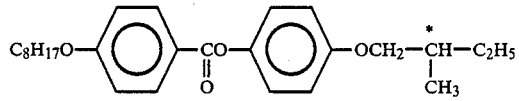

20 parts by weight of

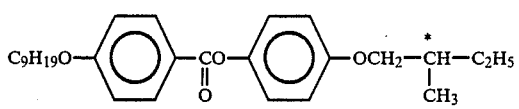

10 parts by weight of

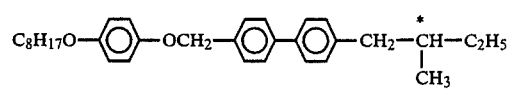

20 parts by weight of

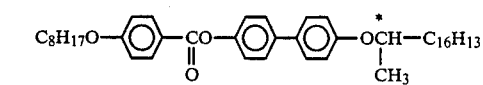

20 parts by weight of

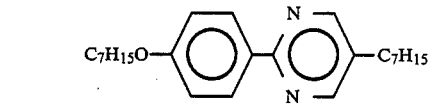

10 parts by weight of

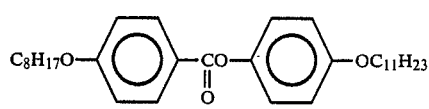

This composition had a temperature range of $S_c^*$ phase of 8°~53° C. A value of spontaneous electric polarization at 38° C. (i.e. T−Tc=−15° C.) was 10 nC/cm², and a helical pitch was 18 μm.

EXAMPLE 9

By using a chiral smectic liquid crystal compound having a helical structure represented by the general formula (I) and a pyrimidine type liquid crystal compound having no helical structure represented by the general formula(XII), a chiral smectic liquid crystal composition having following component ratios was prepared.

10 parts by weight of

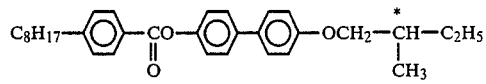

10 parts by weight of

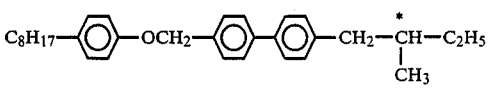

20 parts by weight of

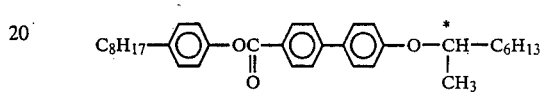

7.2 parts by weight of

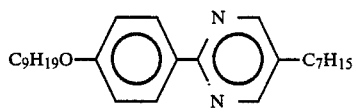

12.6 parts by weight of

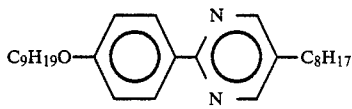

28.2 parts by weight of

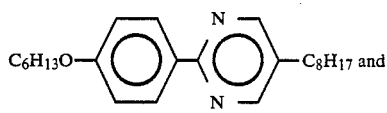 and 12 parts by weight of

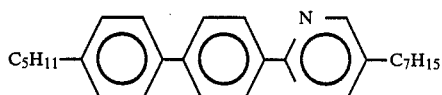

The temperature range of $S_c^*$ phase of this composition was −12° C.~62° C. A value of spontaneous electric polarization at 47° C. (i.e. T−Tc=−15° C.) was 4 nC/cm² and a helical pitch was 8 μm.

EXAMPLES 10~19

The compounds and weight ratios thereof of ferroelectric chiral smectic liquid crystal compositions are shown in Table 2. The temperature ranges of $S_c^*$ phase of the compositions in each examples, values (Ps) of spontaneous electric polarizations at T−Tc=−15° C. and lengths (P) of helical pitches are shown in Table 3.

TABLE 2

Compositions of ferroelectric chiral smectic liquid crystal composition

| Nos. of Example | Compounds and weight ratios thereof of the compositions | |
|---|---|---|
| 10 | $C_8H_{17}O-\phi-COO-\phi-OC_{10}H_{21}$ | 30% by weight |
|  | $C_8H_{17}O-\phi-COO-\phi-OC_{11}H_{23}$ | 20% by weight |
|  | $C_8H_{17}O-\phi-COO-\phi-OC_{12}H_{25}$ | 20% by weight |
|  | $C_8H_{17}O-\phi-COO-\phi-\phi-O-\overset{*}{C}H(CH_3)-C_6H_{13}$ | 30% by weight |
| 11 | $C_8H_{17}-\phi-COO-\phi-OC_{10}H_{21}$ | 35% by weight |
|  | $C_8H_{17}O-\phi-COO-\phi-OC_8H_{17}$ | 23% by weight |
|  | $C_8H_{17}O-\phi-COO-\phi-OCO-\phi-OC_8H_{17}$ | 12% by weight |
|  | $C_8H_{17}O-\phi-\phi-CO-O-CH_2-\overset{*}{C}H(CH_3)-C_2H_5$ | 20% by weight |
|  | $C_{10}H_{21}O-\phi-COO-\phi-COO-CH_2-\overset{*}{C}H(CH_3)-C_2H_5$ | 10% by weight |
| 12 | $C_8H_{17}O-\phi-COO-\phi-O-CH_2-\overset{*}{C}H(CH_3)-C_2H_5$ | (racemate) 44% by weight |
|  | $C_9H_{19}O-\phi-COO-\phi-O-CH_2-\overset{*}{C}H(CH_3)-C_2H_5$ | (racemate) 34% by weight |
|  | $C_8H_{17}O-\phi-COO-\phi-OCO-\phi-OC_8H_{17}$ | 4% by weight |
|  | $C_7H_{15}O-\phi-COO-\phi-\phi-O-\overset{*}{C}H(CH_3)-C_6H_{13}$ | 18% by weight |

TABLE 2-continued
Compositions of ferroelectric chiral smectic liquid crystal composition

| Nos. of Example | Compounds and weight ratios thereof of the compositions | |
|---|---|---|
| 13 | $C_8H_{17}O-\bigcirc-COO-\bigcirc-OC_6H_{17}$ | 29% by weight |
| | $C_8H_{17}-\bigcirc-COO-\bigcirc-OC_{10}H_{21}$ | 38% by weight |
| | $C_{12}H_{25}O-\bigcirc-COO-\bigcirc-OC_4H_9$ | 22% by weight |
| | $C_{12}H_{25}O-\bigcirc-OCO-\bigcirc-\bigcirc-O-\overset{*}{C}H-C_6H_{13}$ <br> $\qquad\qquad\qquad\qquad\qquad\qquad\quad\ |\ $ <br> $\qquad\qquad\qquad\qquad\qquad\qquad\ CH_3$ | 11% by weight |
| 14 | $C_{10}H_{21}O-\bigcirc-COO-\bigcirc-OC_5H_{11}$ | 10% by weight |
| | $C_8H_{17}-\bigcirc-COO-\bigcirc-OC_{10}H_{21}$ | 22% by weight |
| | $C_8H_{17}O-\bigcirc-COO-\bigcirc-O-CH_2-\overset{*}{C}H-C_2H_5$ <br> $\qquad\qquad\qquad\qquad\qquad\qquad\qquad\ |\ $ <br> $\qquad\qquad\qquad\qquad\qquad\qquad\quad\ CH_3$ | (racemate) <br> 38% by weight |
| | $C_8H_{17}O-\bigcirc-\bigcirc-COO-\bigcirc-COO-CH_2-\overset{*}{C}H-C_2H_5$ <br> $\qquad\qquad\qquad\qquad\qquad\qquad\qquad\qquad\qquad\ |\ $ <br> $\qquad\qquad\qquad\qquad\qquad\qquad\qquad\qquad\ CH_3$ | 25% by weight |
| | $C_{11}H_{23}O-\bigcirc-OCO-\bigcirc-\bigcirc-O-\overset{*}{C}H-C_6H_{13}$ <br> $\qquad\qquad\qquad\qquad\qquad\qquad\qquad\ |\ $ <br> $\qquad\qquad\qquad\qquad\qquad\qquad\ CH_3$ | 5% by weight |
| 15 | $C_8H_{17}O-\bigcirc-COO-\bigcirc-OC_8H_{17}$ | 20% by weight |
| | $C_8H_{17}-\bigcirc-COO-\bigcirc-OC_{10}H_{21}$ | 24% by weight |
| | $C_9H_{19}-\bigcirc-COO-\bigcirc-OC_{10}H_{21}$ | 22% by weight |
| | $C_{12}H_{25}O-\bigcirc-COO-\bigcirc-OC_6H_{13}$ | 12% by weight |

TABLE 2-continued
Compositions of ferroelectric chiral smectic liquid crystal composition

| Nos. of Example | Compounds and weight ratios thereof of the compositions | |
|---|---|---|
| | $C_9H_{19}$–⬡–O–CO–⬡–⬡–O–*CH($CH_3$)–$C_6H_{13}$ | 22% by weight |
| 16 | $C_9H_{19}$–⬡–CO–O–⬡–$OC_{10}H_{21}$ | 27% by weight |
| | $C_8H_{17}O$–⬡–CO–O–⬡–O–CO–⬡–$OC_8H_{17}$ | 5% by weight |
| | $C_9H_{19}O$–⬡–CO–O–⬡–O–$CH_2$–*CH($CH_3$)–$C_2H_5$ | (racemate) 45% by weight |
| | $C_8H_{17}O$–⬡–⬡–CO–O–⬡–CO–O–*CH($CH_3$)–$C_6H_{13}$ | 23% by weight |
| 17 | $C_8H_{17}$–⬡–CO–O–⬡–$OC_8H_{17}$ | 26% by weight |
| | $C_9H_{19}$–⬡–CO–O–⬡–$OC_{10}H_{21}$ | 25% by weight |
| | $C_8H_{17}O$–⬡–CO–O–⬡–$OC_8H_{17}$ | 19% by weight |
| | $C_{12}H_{25}O$–⬡–CO–O–⬡–O–$CH_2$–*CH($CH_3$)–$C_2H_5$ | 19% by weight |
| | $C_6H_{13}O$–⬡–⬡–CO–O–⬡–O–$CH_2$–*CH($CH_3$)–$C_2H_5$ | 11% by weight |
| 18 | $C_8H_{17}$–⬡–CO–O–⬡–$OC_{10}H_{21}$ | 33% by weight |
| | $C_9H_{19}$–⬡–CO–O–⬡–$OC_{10}H_{21}$ | 28% by weight |
| | $C_{10}H_{21}$–⬡–CO–O–⬡–$OC_{10}H_{21}$ | 20% by weight |

TABLE 2-continued

Compositions of ferroelectric chiral smectic liquid crystal composition

| Nos. of Example | Compounds and weight ratios thereof of the compositions | |
|---|---|---|
| | C$_9$H$_{19}$O—⟨Ph⟩—O–CO—⟨Ph⟩—⟨Ph⟩—O–*CH(CH$_3$)—C$_6$H$_{13}$ | 19% by weight |
| 19 | C$_8$H$_{17}$—⟨Ph⟩—CO—⟨Ph⟩—OC$_{10}$H$_{21}$ | 35% by weight |
| | C$_9$H$_{19}$—⟨Ph⟩—CO—⟨Ph⟩—OC$_{10}$H$_{21}$ | 30% by weight |
| | C$_{10}$H$_{21}$—⟨Ph⟩—CO—⟨Ph⟩—OC$_{10}$H$_{21}$ | 22% by weight |
| | C$_8$H$_{17}$O—⟨Ph⟩—CO—⟨Ph⟩—⟨Ph⟩—CO–*CH(CH$_3$)—C$_6$H$_{13}$ | 13% by weight |

TABLE 3

Characteristic properties of ferroelectric chiral smectic liquid crystal compositions

| Example Nos. | Sc* phase (°C.) temperature range | Ps (nC/cm$^2$) | P (μm) |
|---|---|---|---|
| 10 | 44~86 | 14 | 20 |
| 11 | 29~67 | 2.5 | 6 |
| 12 | 18~54 | 8.7 | 35 |
| 13 | 30~68 | 6.6 | 45 |
| 14 | 28~67 | 3.4 | 18 |
| 15 | 23~60 | 11 | 23 |
| 16 | 25~67 | 18 | 5 |
| 17 | 21~61 | 1.5 | 10 |
| 18 | 27~62 | 14 | 39 |
| 19 | 29~58 | 8 | 6 |

From the Tables 2 and 3, there are indicated that ferroelectric chiral smectic liquid crystal compositions having long helical pitches, large values of spontaneous electric polarization can be obtained by mixing a liquid crystal compound having Sc phase and no helical structure with a ferroelectric chiral smectic liquid crystal compound.

EXAMPLE 20

A ferroelectric chiral smectic liquid crystal composition prepared according to the process of Example 1 was filled into a cell having been coated with an aligning agent of PVA, and subjected to parallel alignment treatment by rubbing its surface, and having a cell gap of 3 μm and provided with transparent electrodes. When this liquid crystal cell was inserted between two polarizers arranged in crossed nicols state and a low frequency A.C. of 0.5 Hz and 15 V was applied, clear-cut switching operation was observed and thus a liquid crystal display element which shows very good contrast and a quick response of 2 millisecond (m.sec) at 20° C. was obtained.

EXAMPLE 21

A ferroelectric chiral smectic liquid crystal composition prepared according to the process of Example 9 was filled into a cell, having been subjected to parallel alignment treatment similarly as in Example 20, having a cell gap of 3 μm and provided with transparent electrodes. When this liquid cell was inserted between two polarizers arranged in crossed-nicols state and a low frequency A.C. of 0.5 Hz and 15 V was applied. Clear-cut switching operation was observed. Thus a liquid crystal display element having a very quick response of 0.5 m.sec at 25° C. was obtained.

EXAMPLE 22

A ferroelectric chiral smectic liquid crystal composition prepared according to the process of Example 11 was filled into a cell having been subjected to parallel alignment treatment similarly as in Example 20 and having a cell gap of 3 μm and provided with transparent electrodes. When this liquid crystal cell was inserted between two polarizers arranged in crossed-nicols state and a low frequency A.C. of 0.5 Hz and 15 V was applied to this so-called birefringence type display element, clear-cut switching operation was observed and thus a liquid crystal display element which showed very good contrast and a quick response of 2 m.sec at 30° C. was obtained.

EXAMPLE 23

When a composition prepared by adding 3% by weight of anthraquinone dye D-16 (supplied from BDH Co.) to the ferroelectric chiral smectic liquid crystal composition of Example 18 to make a so-called guest-host type, was filled into a cell as in Example 20 and one of the polarizer was arranged so as to make its polarization plane parallel to a molecular axis and a low frequency A.C. of 0.5 Hz and 15 V was applied, clear-cut switching operation was observed and a color liquid crystal display element which showed very good contrast and a quick response of 1.2 m.sec at 30° C. was obtained.

What is claimed is:

1. A ferroelectric chiral smectic liquid crystal composition comprising:

(1) 30–99% by weight of at least one member selected from the group consisting of compounds expressed by the general formulas:

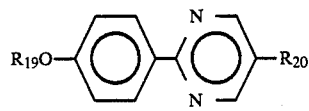

and

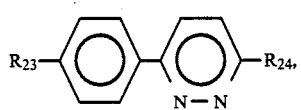

wherein $R_{19}$ represents an alkyl group having 9–18 carbon atoms; $R_{20}$ represents an alkyl group having 7–18 carbon atoms; $R_{23}$ represents an alkyl or an alkyloxy group having 6–18 carbon atoms; and $R_{24}$ represents an alkyl group having 5–18 carbon atoms, said at least one member having a nonchiral smectic C phase, and (2) 70–1% by weight of at least one chiral smectic C liquid crystal compound selected from the group consisting of:

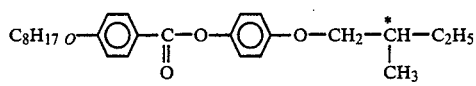

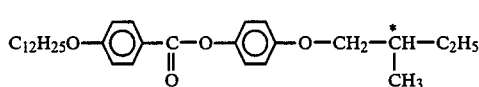

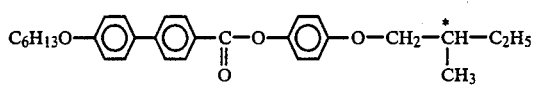

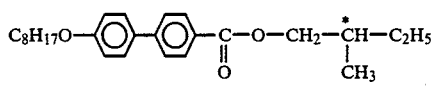

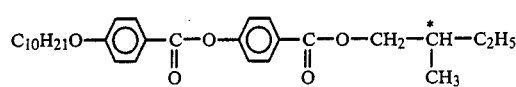

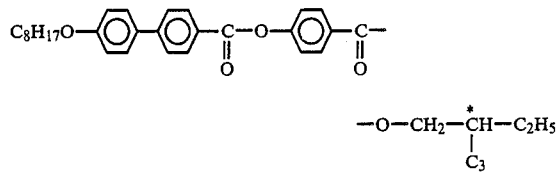

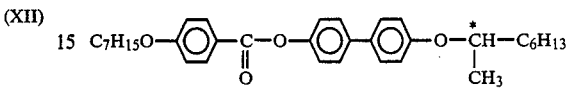

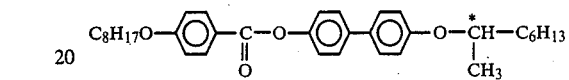

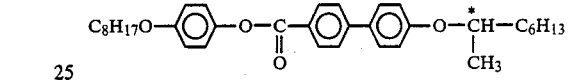

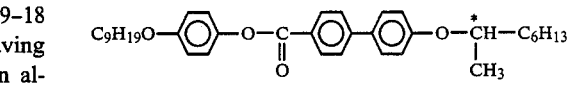

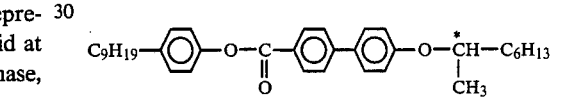

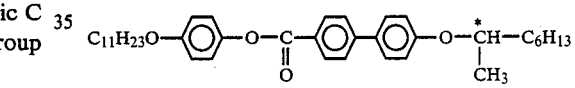

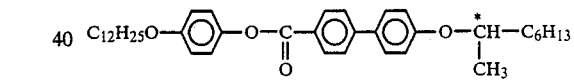

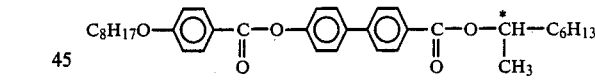

and

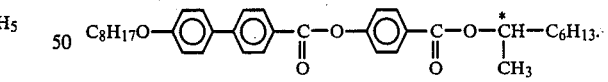

2. A light switching element comprising a ferroelectric chiral smectic liquid crystal composition as set forth in claim 1.

* * * * *

UNITED STATES PATENT AND TRADEMARK OFFICE
CERTIFICATE OF CORRECTION

PATENT NO. : 4,931,208
DATED : June 5, 1990
INVENTOR(S) : KENJI FURUKAWA et al

It is certified that error appears in the above-identified patent and that said Letters Patent is hereby corrected as shown below:

In the second chemical formula of column 34 (Claim 1)

$C_3$ should read $CH_3$

Signed and Sealed this

Eighteenth Day of June, 1991

Attest:

HARRY F. MANBECK, JR.

Attesting Officer

Commissioner of Patents and Trademarks